US012802490B2

(12) United States Patent

Lee et al.

(10) Patent No.: US 12,802,490 B2
(45) Date of Patent: Nov. 17, 2026

(54) SYSTEMS AND METHODS FOR DYNAMIC FACIAL EXPRESSION RECOGNITION

(71) Applicant: Datum Point Labs Inc., Jackson, WY (US)

(72) Inventors: Bokyeung Lee, Seoul (KR); Bonhwa Ku, Seoul (KR); Hanseok Ko, Seoul (KR)

( * ) Notice: Subject to any disclaimer, the term of this patent is extended or adjusted under 35 U.S.C. 154(b) by 219 days.

(21) Appl. No.: 18/604,104

(22) Filed: Mar. 13, 2024

(65) Prior Publication Data

US 2024/0338974 A1 Oct. 10, 2024

Related U.S. Application Data

(60) Provisional application No. 63/457,534, filed on Apr. 6, 2023.

(51) Int. Cl.

| | |
|---|---|
| ***G06V 10/82*** | (2022.01) |
| ***G06V 10/764*** | (2022.01) |
| ***G06V 40/16*** | (2022.01) |

(52) U.S. Cl.

CPC .......... *G06V 40/176* (2022.01); *G06V 10/764* (2022.01); *G06V 10/82* (2022.01)

(58) Field of Classification Search

CPC ..... G06V 40/176; G06V 10/82; G06V 10/764

See application file for complete search history.

(56) References Cited

U.S. PATENT DOCUMENTS 11,106,896 B2 * 8/2021 Hu ........................... G06N 3/08
11,727,724 B1 * 8/2023 Soares .................. G06F 18/214 345/419

OTHER PUBLICATIONS

Hangyu Li, Nannan Wang, Xinpeng Ding, Xi Yang, and Xinbo Gao. Adaptively learning facial expression representation via of labels and distillation. IEEE Transactions on Image Processing, 30:2016-2028, 2021.

Zengqun Zhao and Qingshan Liu. Former-dfer: Dynamic facial expression recognition transformer. In Proceedings of the 29th ACM International Conference on Multimedia, pp. 1553-1561, 2021.

Fanglei Xue, Zichang Tan, Yu Zhu, Zhongsong Ma, and Guodong Guo. Coarse-to-fine cascaded networks with smooth predicting for video facial expression recognition. In Proceedings of the IEEE/CVF Conference on Computer Vision and Pattern Recognition, pp. 2412-2418, 2022.

Liwen Xu, Zhengtao Wang, Bin Wu, and Simon Lui. Mdan: Multi-level dependent attention network for visual emotion analysis. In Proceedings of the IEEE/CVF Conference on Computer Vision and Pattern Recognition, pp. 9479-9488, 2022.

* cited by examiner

*Primary Examiner* — Christopher S Kelley

(74) *Attorney, Agent, or Firm* — The Rapacke Law Group, P.A.

(57) ABSTRACT

Embodiments described herein provide systems and methods for facial expression recognition (FER). Embodiments herein combine features of different semantic levels and classifies both sentiment and specific emotion categories with emotion grouping. Embodiments herein include a model with a bottom-up branch that learns facial expressions representation at different semantic levels and output pseudo labels of facial expressions for each frame using a 2D FER model, and a top-down branch that learns discriminative representations by combining feature vectors of each semantic level for recognizing facial expressions at the corresponding emotion group.

14 Claims, 15 Drawing Sheets

| Method | $L_{cr}$ | $L_{mc}$ | $L_{ta}$ | $L_{ga}$ | WAR (%) |
|---|---|---|---|---|---|
| Former-DFER | ✓ | × | × | × | 66.57 |
| DPCNet | ✓ | × | × | × | 65.78 |
| AEN | ✓ | × | × | × | 68.10 |
| AEN | × | ✓ | × | × | 67.97 |
| AEN | × | × | ✓ | × | 70.23 |
| AEN | × | × | × | ✓ | 69.76 |
| AEN | × | ✓ | ✓ | × | 71.13 |
| AEN | × | ✓ | ✓ | ✓ | 71.64 |

FIG. 10

| Emotion grouping | | | WAR (%) |
|---|---|---|---|
| Positive | Neutral | Negative | |
| Happy, Anger | Neutral, Sad | Fear, Disgust, Surprise | 67.79 |
| Happy | Neutral, Surprise | Fear, Disgust, Sad, Anger | 71.23 |
| Happy, Surprise | Neutral | Fear, Disgust, Sad, Anger | 71.64 |

FIG. 11

| Method | Accuracy of Emotions (%) | | | | | | | 3 Emotions (%) | | 7 Emotions (%) | |
|---|---|---|---|---|---|---|---|---|---|---|---|
| | Happiness | Sadness | Neutral | Anger | Surprise | Disgust | Fear | UAR | WAR | UAR | WAR |
| 3D Resnet18 | 76.32 | 50.21 | 64.18 | 62.85 | 47.52 | 0.00 | 24.56 | - | - | 46.52 | 58.27 |
| Resnet18+LSTM | 83.56 | 61.56 | 68.27 | 65.29 | 51.26 | 0.00 | 29.34 | - | - | 51.32 | 63.85 |
| Resnet18+GRU | 82.87 | 63.83 | 65.06 | 68.51 | 52.00 | 0.86 | 30.14 | - | - | 51.68 | 64.02 |
| Former-DFER | 84.05 | 62.57 | 67.52 | 70.03 | 56.43 | 3.45 | 31.78 | 69.96 | 70.57 | 53.69 | 65.70 |
| STT | 87.36 | 67.90 | 64.97 | 71.24 | 53.10 | 3.49 | 34.04 | - | - | 54.58 | 66.65 |
| NR-DFERNet-v1 | 88.47 | 64.84 | 70.03 | 75.09 | 61.60 | 0.00 | 19.43 | - | - | 54.21 | 68.19 |
| NR-DFERNet-v2 | 86.42 | 65.10 | 70.40 | 72.88 | 50.10 | 0.00 | 45.44 | - | - | 55.77 | 68.01 |
| DPCNet | 89.93 | 64.61 | 67.12 | 63.18 | 53.67 | 15.86 | 31.56 | 71.58 | 71.95 | 55.13 | 66.32 |
| GCA+IAL | 87.95 | 67.21 | 70.10 | 76.06 | 62.22 | 0.00 | 26.44 | - | - | 55.71 | 69.24 |
| AEN | 89.24 | 69.38 | 70.67 | 72.08 | 59.07 | 4.17 | 32.00 | **74.60** | **74.96** | **56.66** | **69.37** |

FIG. 12

| Method | 3 Emotions (%) | | 7 Emotions (%) | |
|---|---|---|---|---|
| | UAR | WAR | UAR | WAR |
| EmotiW-2019 Baseline | - | - | - | 38.81 |
| C3D | - | - | 43.75 | 46.72 |
| I3D-RGB | - | - | 41.86 | 45.41 |
| R(2+1)D | - | - | 42.89 | 46.19 |
| 3D ResNet18 | - | - | 42.14 | 45.67 |
| ResNet18+LSTM | - | - | 43.96 | 48.82 |
| ResNet18+GRU | - | - | 43.75 | 46.72 |
| Former-DFER | 63.94 | 63.66 | 47.42 | 50.92 |
| STT | 66.45 | 67.03 | 49.11 | 54.23 |
| NR-DFERNet | - | - | 48.37 | 53.54 |
| DPCNet | 57.47 | 64.06 | 47.86 | 51.67 |
| AEN | **67.49** | **67.38** | **50.88** | **54.64** |

FIG. 14

SYSTEMS AND METHODS FOR DYNAMIC FACIAL EXPRESSION RECOGNITION

CROSS REFERENCE(S)

The instant application is a nonprovisional of and claim priority under 35 U.S.C. 119 to U.S. provisional application No. 63/457,534, filed Apr. 6, 2023, which is hereby expressly incorporated by reference herein in its entirety.

TECHNICAL FIELD

The embodiments relate generally to systems and methods for facial expression recognition.

BACKGROUND

Facial expression recognition (FER) has received considerable attention in computer vision. Recognizing dynamic facial expressions in videos is generally considered a more practical and reliable approach than still images. However, the dynamic FER problem in videos has challenges in terms of both data acquisition and the structural aspects of the learning model. In particular, video frames that deviate from the target facial expression class can significantly degrade the performance of dynamic FER. Therefore, there is a need for improved systems and methods for dynamic facial expression recognition.

BRIEF DESCRIPTION OF THE DRAWINGS

FIGS. 9A-14 provide charts illustrating exemplary performance of different embodiments described herein.

DETAILED DESCRIPTION

Figure 1:
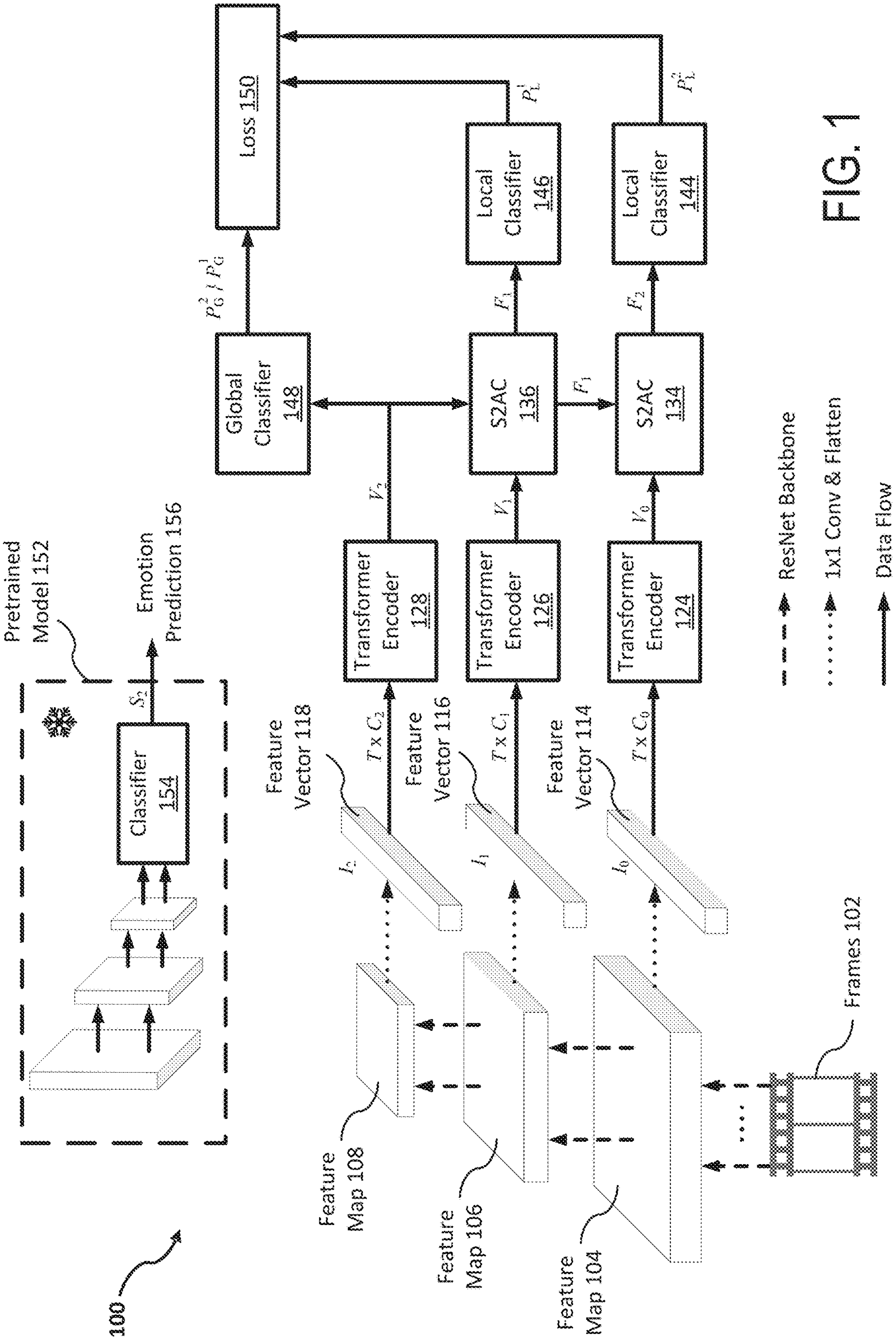
FIG. 1 illustrates a framework for dynamic facial expression recognition, according to some embodiments.

Facial expression recognition (FER) has received considerable attention in computer vision. Recognizing dynamic facial expressions in videos is generally considered a more practical and reliable approach than still images. However, the dynamic FER problem in videos has challenges in terms of both data acquisition and the structural aspects of the learning model. In particular, video frames that deviate from the target facial expression class can significantly degrade the performance of dynamic FER. For example, a sequence of frames in a video may include irrelevant frames to the target emotion of the video clip as well as occluded facial features and non-frontal poses. In an example, a video demonstrating a "happy" expression may include frames that individually contain another facial expression such as disgust that are not related to happiness. Frames may also include multiple facial expressions with different emotions that are more closely related to the target emotion label because of facial changes resulting from conversation or eye blinking In view of the need for improved systems and methods for facial expression recognition, embodiments herein describe an improved framework for facial expression recognition (FER). Embodiments herein include a dynamic FER model that utilizes a hierarchical emotion grouping approach while reducing a loss of emotion information in the process of extracting features from facial expressions. Embodiments herein describe an affectivity extraction network (AEN) for dynamic FER that uses emotion grouping learning.

Embodiments described herein include an AEN that combines features of different semantic levels for a hierarchical emotion grouping approach. AEN as described herein may consist of two branches with 2D convolutional neural network (CNN), temporal transformers, semantic-to-affective converters (S2ACs), and classifiers.

The bottom-up branch learns facial expressions at the different semantic levels and outputs probabilities for a facial expression class for each frame using a 2D FER model. Feature maps extracted from convolution layers in CNN have different semantic levels, and the feature map of higher semantic levels is extracted at deeper layers. While feature maps at lower semantic levels are spatially fine but semantically weak, those at higher semantic levels are spatially coarse but semantically strong. In a two-level hierarchical emotion grouping model, a high affective level increases the granularity of emotions, and in order to recognize the fine-grained emotion categories well, the combining of a low-level semantic feature map with a high-level semantic feature map may be utilized.

The top-down branch learns discriminative feature representation by combining feature vectors of each semantic level and a high semantic level for recognizing facial expressions at the corresponding affective level. To generate effectively combined feature vectors, an attention-based semantic-to-affective converter may be utilized. To reduce the loss of emotional information in AEN, a two frame-level emotion-guided loss function may be used, guided by the emotional probabilities of each frame. The frame-level emotion-guided loss functions consist of a temporal affectivity extraction loss and a global affectivity extraction loss. The temporal affectivity extraction loss function allows the temporal transformer to maintain emotional feature representation corresponding to the target emotion while compressing the changes in facial expression. The global affectivity extraction loss function aims that the emotional probability of each affective level follows that of each semantic level. The two loss functions allow AEN to understand what emotions are included in the video clip.

Embodiments described herein provide a number of benefits. For example, The AEN method provides more accurate facial expression recognition than alternative methods. By performing analysis at multiple affective layers and combining the results, the model is more robust to subtle changes in facial expression across frames of a video.

FIG. 1 illustrates a framework 100 for dynamic facial expression recognition, according to some embodiments. As framework 100 provides predictions of facial expression by extracting information from different affective levels, it may be called an affectivity extraction network (AEN). Framework 100 includes two hierarchical branches: a bottom-up and a top-down branch. The bottom up branch generates spatio-temporal feature representations of different semantic levels and a top-down branch provides discriminative features based on the affective levels by combining feature vectors of each semantic level and a high semantic level. A convolutional neural network (CNN) is used as a backbone network of the bottom-up branch to extract static information. For example, ResNet18 as described in He et al., Deep residual learning for image recognition, Proceedings of the IEEE conference on computer vision and pattern recognition, pp. 770-778, 2016. Specifically, static images (frames 102) from a video are input to the CNN. For example, 16 consecutive images (frames 102) from a video containing a face. The number of frames 102 used in a single pass is denoted herein as T. The CNN generates features maps 104, 106, and 108, each at a different semantic level. For example, feature map 106 may have a lower dimensionality than feature map 104, and therefore represent more coarse features than feature map 104. Similarly, feature map 108 may have even lower dimensionality than feature map 106, and may therefore represent even coarser features. The illustrated feature maps are exemplary, and more or fewer feature maps may be utilized according to some embodiments.

The feature maps 104, 106, and 108 at each semantic level are transformed to feature vectors 114, 116, and 118 respectively. Feature vectors may be represented as $I_S \in R^{T \times C_s}$, s=0, 1, 2. Feature maps 104, 106, and 108 may be transformed using a squeeze operation, which consists of point-wise convolution and flattening to produce feature vectors 114, 116, and 118. Feature vectors 114, 116, and 118 are forwarded into corresponding temporal transformer encoders 124, 126, and 128 respectively. In some embodiments, multiple frames (e.g., 16) are input to the CNN, thereby generating a multiple feature maps at each semantic level, and multiple feature vectors at each semantic level. Transformer encoders 124, 126, and 128 may receive as input multiple (e.g., 16) feature vectors, each representing a different frame 102. Transformer encoders 124, 126, and 128 calculate correlations between frames as represented by feature vectors 114, 116, and 118 to capture temporal correlation. The output of temporal transformer encoders 124, 126, and 128 at their respective semantic levels may be represented as $V_s \in R^{C_s \times 1}$, s=0, 1, 2. The output of temporal transformer encoders 124, 126, and 128 ($V_s$) represent spatio-temporal feature vectors representing each semantic level.

A top-down branch including two semantic to affective converters, S2AC 134 and S2Ac 136. The top-down branch also includes three classifiers: local classifiers 144 and 146, and global classifier 148. The outputs of transformer encoders 124 and 126 ($V_s$) are forwarded respectively to S2ACs 134 and 136. The high semantic information $V_2$ from transformer encoder 128 is forwarded to the global classifier 148. S2AC 134 also receives features from S2AC 136, and similarly S2AC 136 receives features from transformer encoder 128, thereby providing a fusion of low-level features with high-level features. The fusion of low-level features with high-level semantic information increases the granularity of emotions. Through S2ACs 134 and 136, the feature representation is converted to be interpretable at the affective level. The outputs of S2ACs 134 and 136 may be represented as Fa, where $F_2$ is the output of S2AC 134, and $F_1$ is the output of S2AC 136, where the subscript a denotes the affective level. Since affective level of $F_2$ is higher than $F_1$, $F_2$ is useful to determine specific emotion categories. Combined features $F_1$ and $F_2$ are forwarded to each local classifier, respectively. The function and structure of S2ACs 134 and 136 are further described in FIG. 2.

A pretrained model 152 may also be utilized to generate emotion predictions 156 of T input facial images/frames. Pretrained model 152 may be a CNN model that is pretrained on a facial expression recognition dataset of 2D images. Pretrained model 152 may be, for example, another ResNet18 network. Pretrained model 152 may include, for example, similar layers to that of the backbone CNN, and a classifier 154 that generates the final emotion prediction 156 based on the final feature map of the CNN model. In some embodiments, pretrained model 152 is frozen after pretraining and is not trained with the remainder of the model. At inference, pretrained model 152 may not be used. Emotion predictions 156 may be used as pseudo labels as described below. In some embodiments, pretrained model 152 is trained on a dataset that includes static facial expressions, and is not trained on a dynamic facial expression recognition dataset (i.e., individual images rather than frames of a video).

Figure 2:
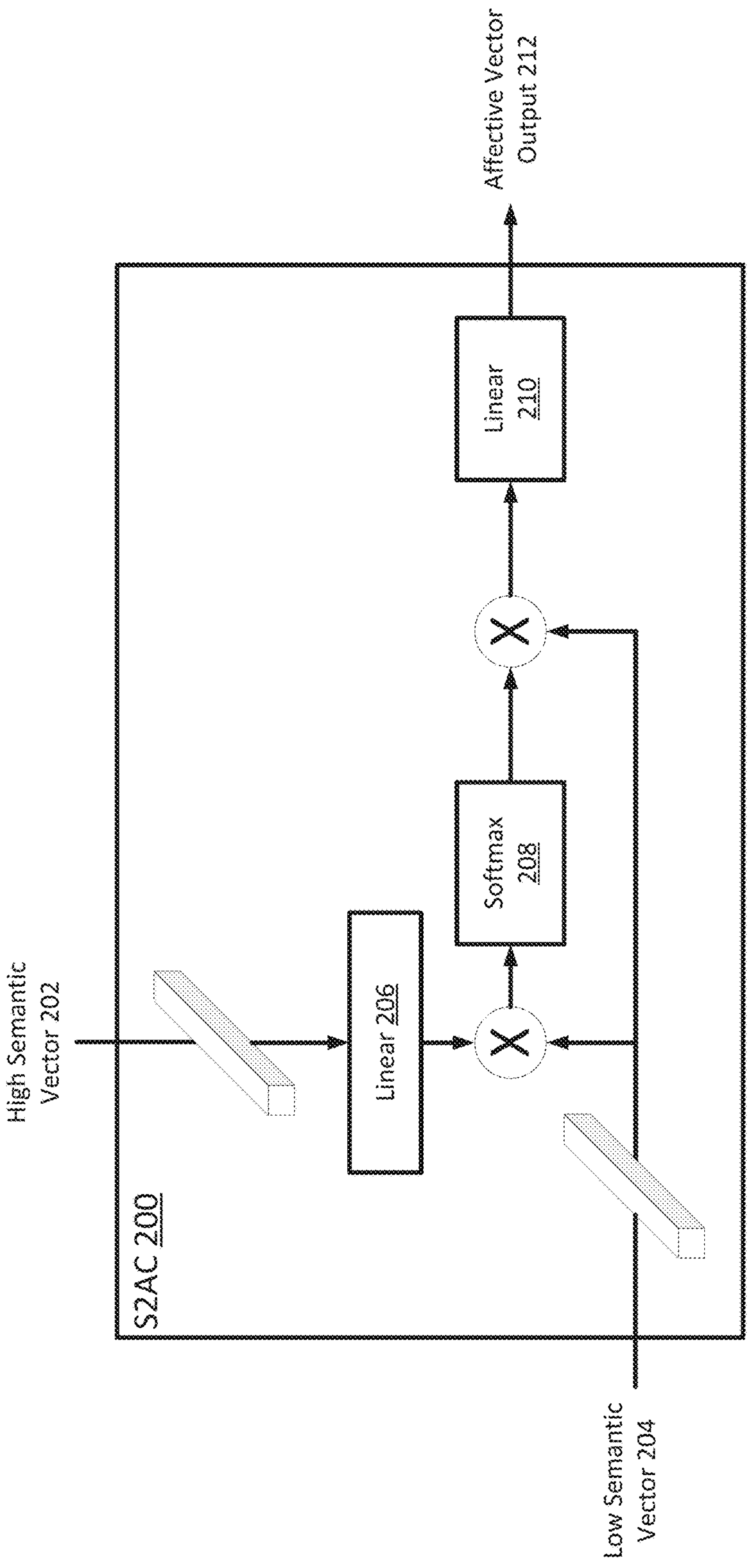
FIG. 2 illustrates a simplified diagram of a semantic to affective converter, according to some embodiments.

FIG. 2 illustrates a simplified diagram of a semantic to affective converter (S2AC) 200, according to some embodiments. S2AC 200 may be a S2AC 136 and/or S2AC 134. S2AC 200 may receive a low semantic vector 204 (e.g., a relatively fine-grained feature map) and a high semantic vector 202 (e.g., a relatively coarse-grained feature map). For example, low semantic vector 204 may be the output of transformer encoder 124, and the high semantic vector 202 may be the output of S2AC 136. In another example, low semantic vector 204 may be the output of transformer encoder 126, and the high semantic vector 202 may be the output of transformer encoder 128.

The high semantic vector 202 may be of a lower dimensionality that low semantic vector 204. To compensate for this difference, high semantic vector 202 may be fed to a linear layer 206, and the number of dimensions may be expanded to match the dimensions of low semantic vector 204. The modified high semantic vector 202 may be combined (e.g., via multiplication) with low semantic vector 204. The combined output may be input to a softmax 208. Softmax 208 helps quantify the correlation between the two input vectors 202 and 204. By multiplying those together, we the resulting feature vector is enhanced with low semantic level strongly related to feature vector with high semantic level. All element-wise dependencies may be discovered between features at the neighboring affective level. For affective level α, S2AC 200 may be formulated as:

$$F_a = W_2 \rho\left(\frac{W_1 F_{a-1} V_{2-a}^T}{\sqrt{C_{2-a}}}\right) V_{2-a},\ a = 1, 2 \tag{1}$$

where $W_1$ and $W_2$ are weights of linear layers 206 and 210 respectively, ρ denotes row-wise softmax function (i.e., softmax 208), $F_{a-1}$ is the high semantic vector 202, and $V_{2-a}$ is the low semantic vector 204. $F_0$ is set to $V_2$ (e.g., the output of transformer encoder 128). A fusion of low-level features with high-level semantic information increases the granularity of emotions. Through S2AC 200, feature representation is converted to be interpretable at the affective level. Since affective level of $F_2$ is higher than $F_1$, $F_2$ is useful to determine specific emotion categories. Affective vector output 212 represents the combined features of low semantic vector 204 and high semantic vector 202 (e.g., $F_1$ and $F_2$). Affective vector output 212 is forwarded to a local classifier, (e.g., local classifiers 144 and 146 respectively for S2AC 134 and 136).

Returning to the discussion of FIG. 1, the AEN may us the pseudo-labels (emotion predictions 156), the output of global classifier 148, and the outputs of local classifiers 144 and 146 to train parameters of framework 100. For example, framework 100 (AEN in some embodiments) may be trained via emotion group learning. Emotion group learning encourages AEN to mimic the cognitive mode of human beings and to learn important expression information. As described below in FIG. 3, emotion categories may be grouped into groups in a hierarchy of affective levels. For example, affective level 301 may represent a=1, affective level 302 may represent a=2, and affective level 303 may represent a=3. Other groupings may be utilized than the one illustrated in FIG. 3. For example, happy and surprise categories may be grouped with a=2 as sub-categories of the group "positive" with a=1. In order for the AEN to be used effectively, a multi-class loss function may be used that reflects the hierarchical emotion group learning. In some embodiments, components of framework 100 are trained using a multi-class cross-entropy loss function 150 that reflects the predictions of global classifier 148 and local emotion classifiers 144 and 146. The aim of emotion group learning is to find common representations of facial regions in videos. The multi-class loss function 150 for emotion group learning can be formulated as $$L_{mc} = -\sum_{a=1}^{H_a}\sum_{k=1}^{|K_a|} Y_k^a P_{O,k}^a \tag{2}$$

where $H_\alpha$ means the number of affective levels. $|K_i|$ is the number of emotion groups at affective level $\alpha$, and $$Y_k^a$$

denotes the ground truth value of the emotion class belonging to the affective level.

$$P_O^a$$

refers to the overall prediction at each affective level and is defined as $$P_O^a = \alpha \times \rho(P_L^a) + (1-\alpha) \times \rho(P_G^a) \tag{3}$$

where $$P_L^a \text{ and } P_G^a$$

are the outputs of the local classifiers 144 and 146 and the global classifier 148, respectively. $\alpha$ is a fusion parameter, which controls the relative importance between $P_L$ and $P_G$. The local classifier prediction at each level is output by a separate local classifier (i.e., 144 or 146). The global classifier directly outputs a global prediction at the highest affective level, and global predictions for other affective levels may be computed. For example, a global prediction for group j at $$a-1, \rho(P_{G,j}^{a-1})$$

may be acquired by summing the global probability of all sub-categories k at a of group j at $$a-1, \rho(P_{G,j}^{a-1}) = \sum\nolimits_{k \in j} \rho(P_{G,k}^a).$$

In Equations (2) and (3), the multi-class loss is the cross entropy between a one-hot distribution $$Y_k^a$$

and estimated probability $$\rho(P_{O,k}^a).$$

By minimizing $L_{mc}$, AEN is simultaneously optimized to learn discriminative feature representations at each affective level, i.e., an image is classified as "positive" at a=1 and is classified as "happy" at a=2. The illustrated example in FIG. 1 includes two affective levels, with predictions at each respective level by an individual local classifier (local classifier 144 and 146 respectively predicting at affective levels 2 and 1) and a prediction by global classifier 148 that directly provides a prediction at affective level 2, which is used to compute a prediction at affective level 1. Other amounts of affective levels may be utilized by increasing the number of semantic levels for which feature maps are extracted from the backbone CNN, with corresponding transformer encoders, S2ACs, and local classifiers.

Additional loss functions may be utilized together with $L_{mc}$ to improve model performance. In dynamic FER, there are several problems, which cause performance degradation but may be helped by including additional loss functions. The temporal transformer encoders 124, 126, and 128 play the role of converting spatio-temporal information into the discriminant feature vector. However, it is difficult for the temporal transformer encoders 124, 126, or 128 to convert feature maps at each semantic level into discriminant feature vectors without frame-level guide information since compressed semantic information is used as input. Also, if the video input data contains frames 102 different from the emotion of the video clip, the temporal transformer encoders 124, 126, and 128 cannot guarantee the acquisition of the discriminant feature vector. That is, if only the cross-entropy loss function is used in model training, there is a limit to extracting discriminant features for emotion recognition because cross-entropy does not consider the ambiguity that comes from video data actually containing multiple emotions. To address this issue, frame-level emotion-guided loss functions induced by the emotional probabilities of each frame may be used. Specifically, a temporal affectivity extraction loss and/or a global affectivity extraction loss.

The pre-trained model 152 may be used as a guide network for pseudo-label generation. As illustrated, emotion predictions 156 may be used as pseudo-labels $S_2$. Emotion predictions 156 may be at the highest affective level (Affective level 2 in the illustrated example, or affective level 303 in FIG. 3), meaning the finest-grain emotion indication. Coarse-grain (lower affective level) predictions may be computed by summing, and normalizing as needed, the fine-grained predictions together within each respective lower affective level grouping. During training, emotional probabilities $S_2 \in R^{T \times K2}$ may be acquired, and AEN may use a one-hot encoded target $Y^{H_\alpha} \in R^{K2 \times 1}$. $H_a$ denotes the number of affective levels. Y is a one-hot encoded vector that represents the emotion for which the source video is labeled. For example, in a training dataset including a number of video clips comprising multiple frames, each video clip may have a singular emotion label associated with each video clip (not for the individual frames 102). For fine-grained emotion classes, the dimension of Y may be 7 for example, and for coarse-grained emotion classes the dimension of Y may be 3. The temporal affectivity extraction loss allows transformer encoders 124, 126, and/or 128 to reduce the loss of information related to the target emotion of the video clip. The temporal affectivity extraction loss can be formulated as $$L_{ta} = \sum_{i=0}^{2} \left\| V_i - I_i^T S_2 Y^{H_a} \right\|_1^1 \tag{4}$$

where $S_2 Y^{H_\alpha} \in \mathbb{R}^{T \times 1}$ denotes the probability of emotion of each frame related to the ground truth emotion of the video clip and is considered as the importance weights of the input of the temporal transformer encoder 124, 126, or 128 respectively. $L_{ta}$ is defined the difference between $V_s$ and the weighted sum of $I_s$. By minimizing $L_{ta}$, the transformer encoder 124, 126, or 128 directly learns to ignore irrelevant frames while highlighting frames corresponding to the emotion of the video clip. Then, the transformer encoder 124, 126, or 128 output $V_s$ has the information with dominant emotion as well as the correlation between frames.

To apply a global affectivity extraction loss function, each output of local-classifiers 144 and 146

$$(P_L^a)$$

may be independently translated into the range 0-1 using the sigmoid ($\sigma$) function. The output of sigmoid may be interpreted as the emotional probability of the input video. The emotional probability of each affective level in AEN may follow that of each semantic level. Accordingly, a global affectivity extraction loss may also be used that encourages AEN to predict emotional distribution at each local classifier as follows:

$$L_{ga} = \sum_{a=1}^{H_a} \beta_i \left\| \sigma(P_L^a) - \rho(S_a^T 1) \right\|_2^2 \tag{5}$$

where $\beta_i$ represents weights of loss corresponding to affective level, $1 \in R^{T \times 1}$ denotes a one-vector that all elements are one, and frame-level emotional probabilities at each affective level can be represented as $S_{j,\alpha-1} = \Sigma_{k \in j} S_{k,\alpha}$ according to emotion grouping.

$$P_L^a$$

is the output of local classifier at affective level $\alpha$, and it is transformed between 0 and 1 using sigmoid function $$\sigma \cdot \rho(S_a^T 1)$$

represents the mean of frame-level probabilities for the emotion class in each affective level. $L_{g\alpha}$ is the difference between the output of local classifier and pseudo probabilities generated by frame-level emotional probabilities. AEN may be trained with the following total loss function:

$$L = L_{mc} + \lambda_1 L_{ta} + \lambda_2 L_{ga} \tag{6}$$

where $\lambda 1$ and $\lambda 2$ are regularization parameters. Loss 150 may be the loss function in equation (6). In some embodiments, loss 150 is used to update parameters of (i.e., train via backpropagation) the backbone CNN, transformer encoders 124, 126, 128, S2ACs 134, 136, global classifier 148, and/or local classifiers 144, 146.

Figure 3:
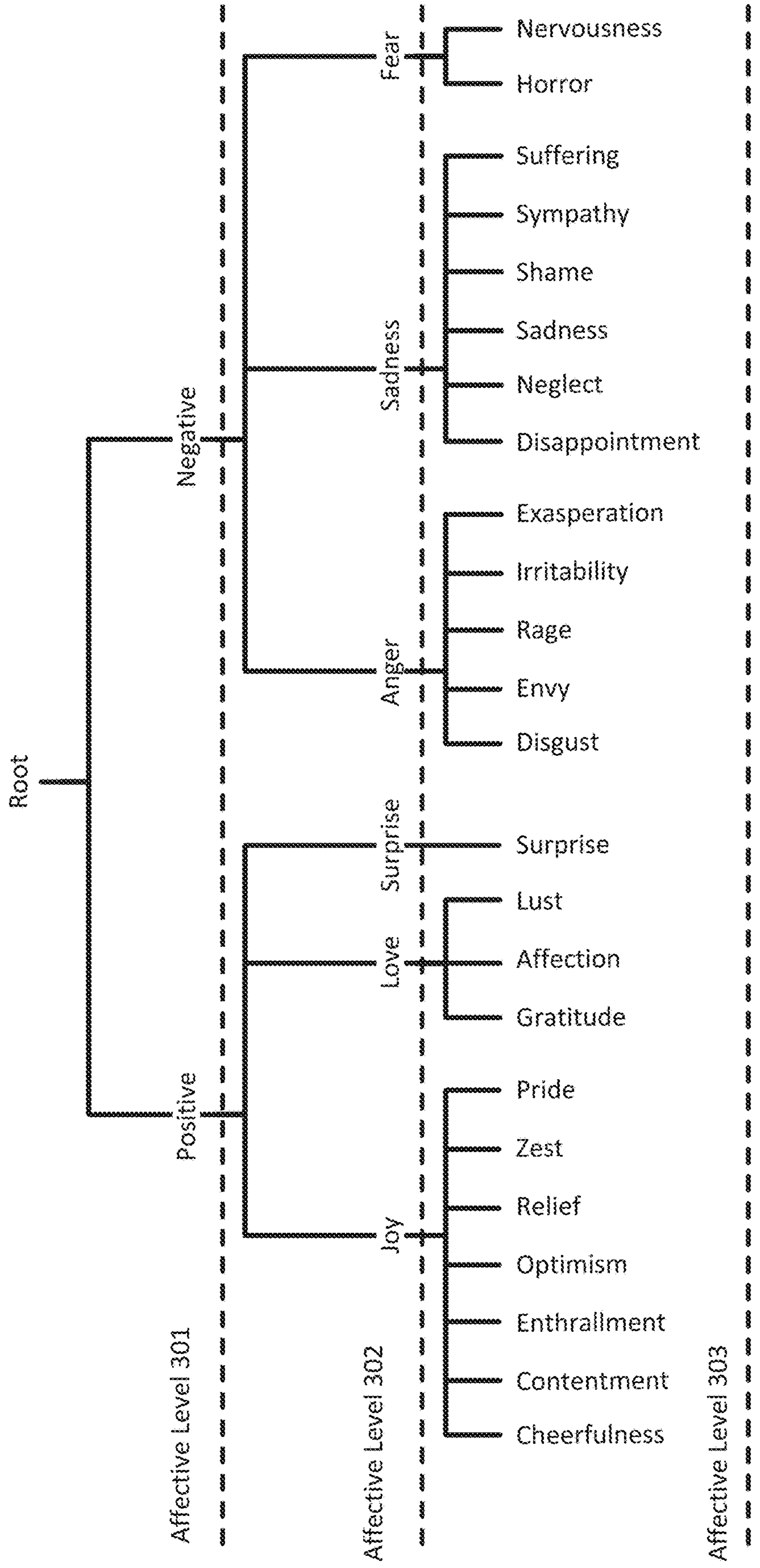
FIG. 3 illustrates an exemplary diagram of affective levels, according to some embodiments.

FIG. 3 illustrates an exemplary diagram of affective levels, according to some embodiments. As described in FIGS. 1-2, embodiments described herein utilize a hierarchical emotion grouping approach in the process of extracting features from facial expressions. The diagram in FIG. 3 illustrates an exemplary affective level hierarchy including three different levels. In some embodiments, greater or fewer levels may be utilized, and different specific categorizations or labels. In the illustrated example, affective level 301 includes two broad classes of expression, positive and negative. Affective level 302 provides a slightly more granular categorization of expressions, breaking positive expressions into joy, love, and surprise, and breaking negative expressions into anger, sadness, and fear. In the illustrated example, affective level 303 provides the greatest level of granularity in providing specific expressions including cheerfulness, contentment, enthrallment, optimism, relief, zest, pride, gratitude, affection, lust, surprise, disgust, envy, rage, irritability, exasperation, disappointment, neglect, sadness, shame, sympathy, suffering, horror, and nervousness, each associated with a corresponding expression group from affective level 302 as illustrated. In some embodiments, labels used for global classifier 148, local classifier 146, and local classifier 144 are expressions at corresponding affective levels of FIG. 3. For example, global classifier 148 may identify expressions from affective level 303, local classifier 146 may identify expressions from affective level 302, and local classifier 144 may identify expressions from affective level 301.

Figure 4:
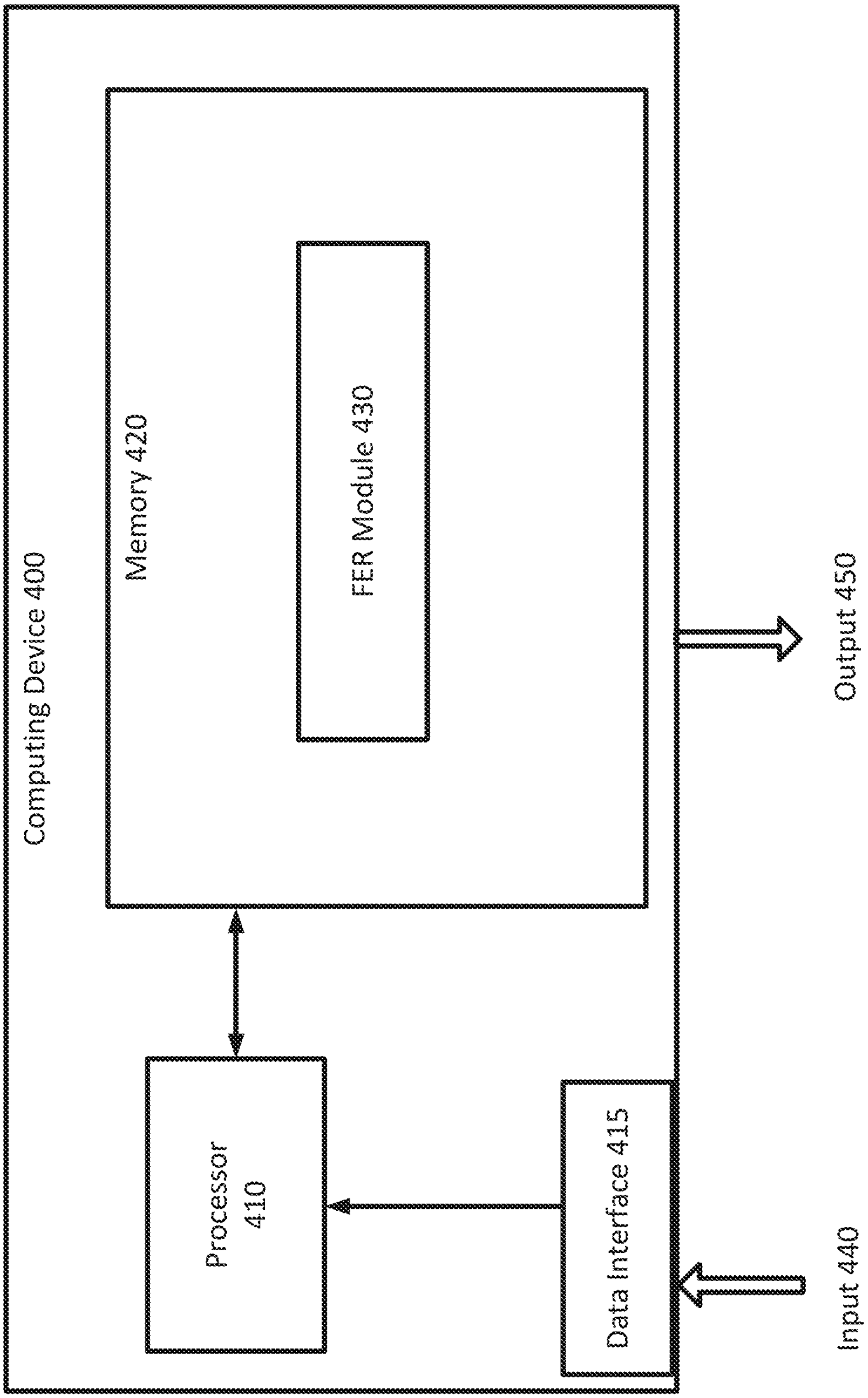
FIG. 4 is a simplified diagram illustrating a computing device implementing the framework described herein, according to some embodiments.

FIG. 4 is a simplified diagram illustrating a computing device 400 implementing the framework described herein, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of transitory or non-transitory machine-readable media (e.g., computer-readable media). Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for FER module 430 that may be used to implement and/or emulate the systems and models, and/or to implement any of the methods described further herein.

FER module 430 may receive input 440 such as a video comprising multiple frames with a face and generate an output 450 such as an emotion prediction. For example, FER module 430 may be configured to predict the emotion of a face based on a neural network based model. FER module 430 may be further configured to train the neural network based model based on the predictions.

The data interface 415 may comprise a communication interface, a user interface (such as a voice input interface, a graphical user interface, and/or the like). For example, the computing device 400 may receive the input 440 from a networked device via a communication interface. Or the computing device 400 may receive the input 440, such as video images, from a user via the user interface.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
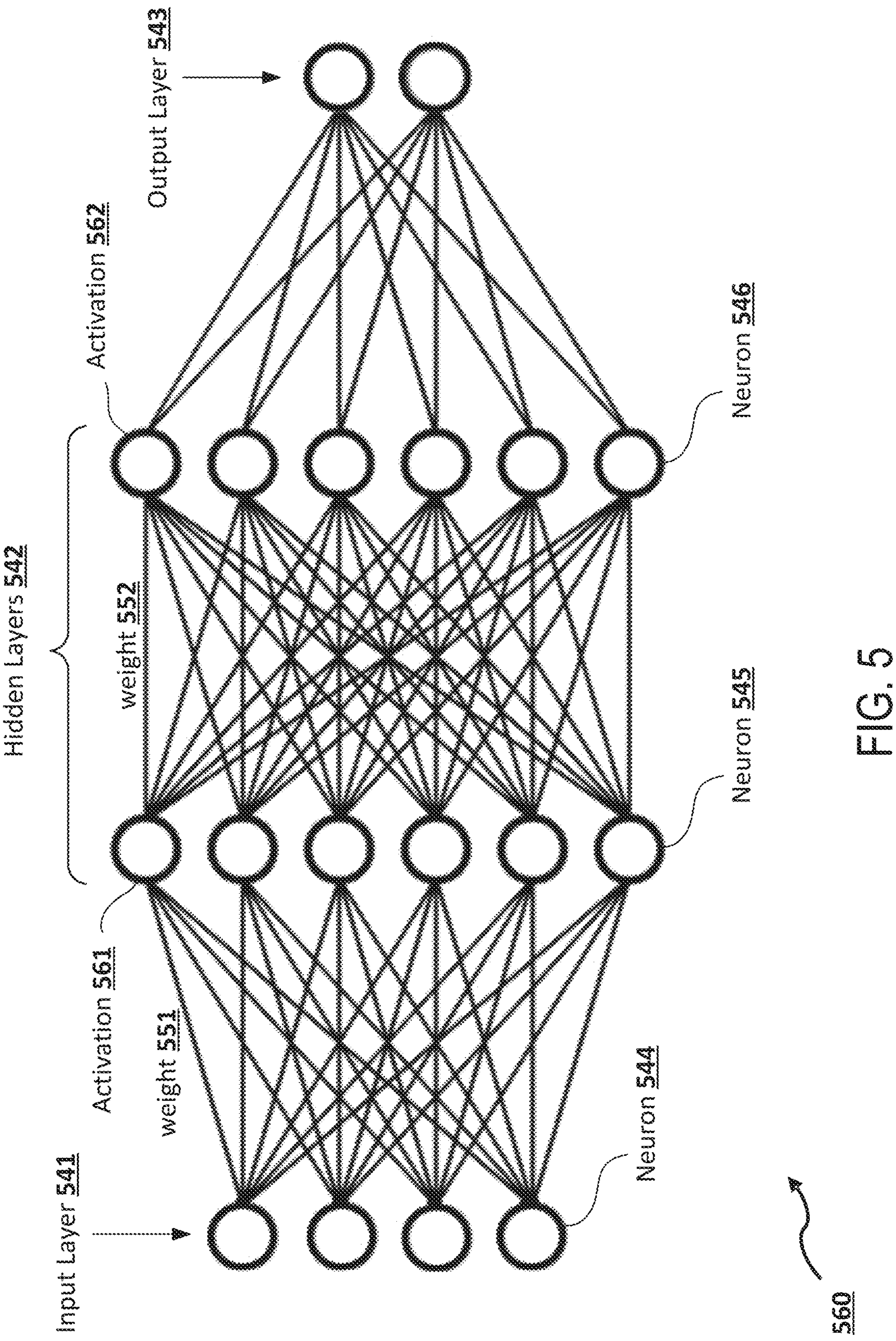
FIG. 5 is a simplified diagram illustrating a neural network structure, according to some embodiments.

FIG. 5 is a simplified diagram illustrating the neural network structure, according to some embodiments. In some embodiments, the FER module 430 may be implemented at least partially via an artificial neural network structure shown in FIG. 5. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data such as training data, user input data, vectors representing latent features, etc. The number of nodes (neurons) in the input layer 541 may be determined by the dimensionality of the input data (e.g., the length of a vector of the input). Each node in the input layer represents a feature or attribute of the input.

The hidden layers 542 are intermediate layers between the input and output layers of a neural network. It is noted that two hidden layers 542 are shown in FIG. 5 for illustrative purpose only, and any number of hidden layers may be utilized in a neural network structure. Hidden layers 542 may extract and transform the input data through a series of weighted computations and activation functions.

For example, as discussed in FIG. 4, the FER module 430 receives an input 440 and transforms the input into an output 450. To perform the transformation, a neural network such as the one illustrated in FIG. 5 may be utilized to perform, at least in part, the transformation. Each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the FER module 430 may comprise the transformative neural network structure of layers of neurons, and weights and activation functions describing the non-linear transformation at each neuron. Such a neural network structure is often implemented on one or more hardware processors 410, such as a graphics processing unit (GPU).

In one embodiment, the FER module 430 may be implemented by hardware, software and/or a combination thereof.

For example, the FER module 430 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based FER module 430 may be trained by iteratively updating the underlying parameters (e.g., weights 551, 552, etc., bias parameters and/or coefficients in the activation functions 561, 562 associated with neurons) of the neural network based on a loss function. For example, during forward propagation, the training data such as video data with emotion labels are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding emotion) from the training data (and/or from generated pseudo-labels), to compute a loss function that measures the discrepancy between the predicted output and the expected output. Given a loss function, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as new video with a different face.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 5 is exemplary. For example, different neural network structures may be utilized, and additional neural-network based or non-neural-network based component may be used in conjunction as part of module 430. For example, a text input may first be embedded by an embedding model, a self-attention layer, etc. into a feature vector. The feature vector may be used as the input to input layer 541. Output from output layer 543 may be output directly to a user or may undergo further processing. For example, the output from output layer 543 may be decoded by a neural network based decoder. The neural network illustrated in FIG. 500 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 430. The trained neural network thus improves neural network technology in FER.

Figure 6:
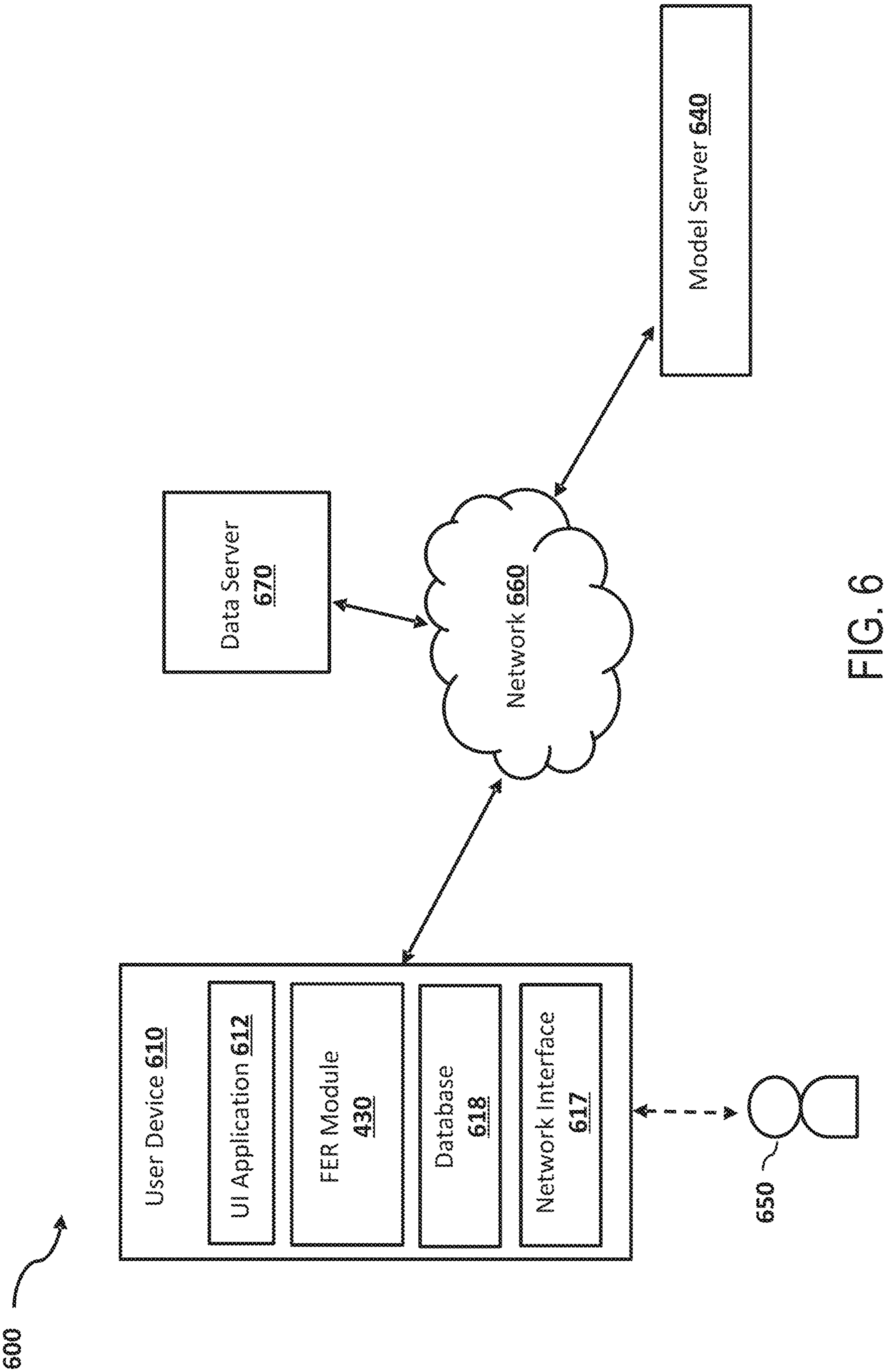
FIG. 6 is a simplified block diagram of a networked system suitable for implementing the framework described herein.

FIG. 6 is a simplified block diagram of a networked system 600 suitable for implementing the framework described herein. In one embodiment, system 600 includes the user device 610 (e.g., computing device 400) which may be operated by user 650, data server 670, model server 640, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, a real-time operation system (RTOS), or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities. In some embodiments, user device 610 is used in training neural network based models. In some embodiments, user device 610 is used in performing inference tasks using pre-trained neural network based models (locally or on a model server such as model server 640).

User device 610, data server 670, and model server 640 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660. User device 610, data server 670, and/or model server 640 may be a computing device 400 (or similar) as described herein.

In some embodiments, all or a subset of the actions described herein may be performed solely by user device 610. In some embodiments, all or a subset of the actions described herein may be performed in a distributed fashion by various network devices, for example as described herein.

User device 610 may be implemented as a communication device that may utilize appropriate hardware and software configured for wired and/or wireless communication with data server 670 and/or the model server 640. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and FER module 430, which may correspond to executable processes, procedures, and/or applications with associated hardware. For example, the user device 610 may allow a user to receive emotion predictions. User device 610 may allow a user 650 to interact with a system that records the face of user 650 and responds according to the prediction emotion of user 650 as predicted by the neural network based model. In other embodiments, user device 610 may include additional or different modules having specialized hardware and/or software as required.

In various embodiments, user device 610 includes other applications as may be desired in particular embodiments to provide features to user device 610. For example, other applications may include security applications for implementing client-side security features, programmatic client applications for interfacing with appropriate application programming interfaces (APIs) over network 660, or other types of applications. Other applications may also include communication applications, such as email, texting, voice, social networking, and IM applications that allow a user to send and receive emails, calls, texts, and other notifications through network 660.

Network 660 may be a network which is internal to an organization, such that information may be contained within secure boundaries. In some embodiments, network 660 may be a wide area network such as the internet. In some embodiments, network 660 may be comprised of direct physical connections between the devices. In some embodiments, network 660 may represent communication between different portions of a single device (e.g., a communication bus on a motherboard of a computation device).

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

User device 610 may further include database 618 stored in a transitory and/or non-transitory memory of user device 610, which may store various applications and data (e.g., model parameters) and be utilized during execution of various modules of user device 610. Database 618 may store images, predictions, etc. In some embodiments, database 618 may be local to user device 610. However, in other embodiments, database 618 may be external to user device 610 and accessible by user device 610, including cloud storage systems and/or databases that are accessible over network 660 (e.g., on data server 670).

User device 610 may include at least one network interface component 617 adapted to communicate with data server 670 and/or model server 640. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data Server 670 may perform some of the functions described herein. For example, data server 670 may store a training dataset including video, emotion labels, etc. Data server 670 may provide data to user device 610 and/or model server 640. For example, training data may be stored on data server 670 and that training data may be retrieved by model server 640 while training a model stored on model server 640.

Model server 640 may be a server that hosts models described herein. Model server 640 may provide an interface via network 660 such that user device 610 may perform functions relating to the models as described herein (e.g., analyze video from user device 610 to make emotion predictions). Model server 640 may communicate outputs of the models to user device 610 via network 660. User device 610 may display model outputs, or information based on model outputs, via a user interface to user 650.

Figure 7:
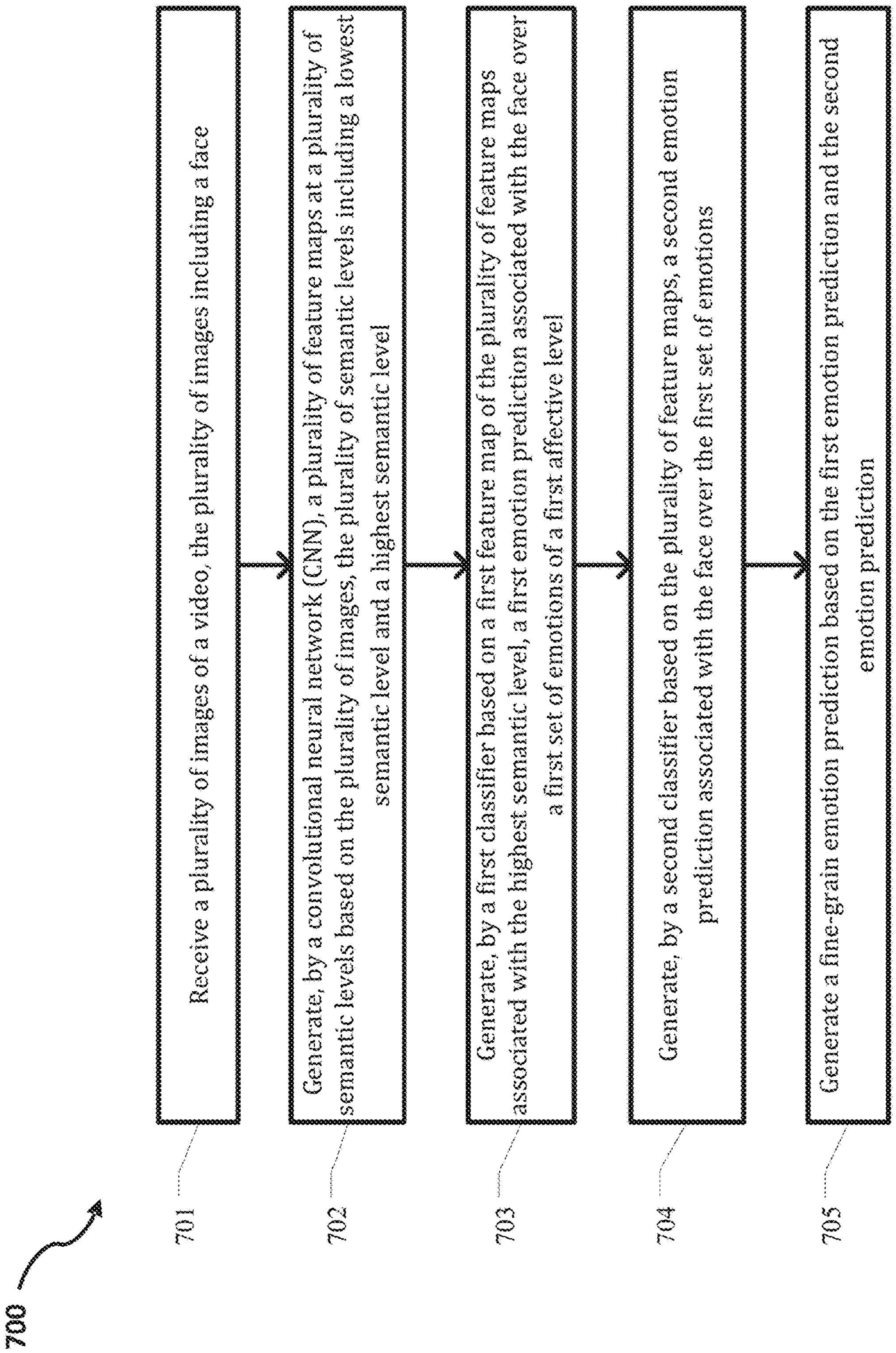
FIG. 7 is an example logic flow diagram, according to some embodiments.

FIG. 7 is an example logic flow diagram, according to some embodiments described herein. One or more of the processes of method 700 may be implemented, at least in part, in the form of executable code stored on non-transitory, tangible, machine-readable media that when run by one or more processors may cause the one or more processors to perform one or more of the processes (e.g., computing device 400). In some embodiments, method 700 corresponds to the operation of the FER module 430 that performs FER and/or model training.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system (e.g., computing device 400, user device 610, model server 640, device 800, or device 815) receives (e.g., via a data interface 415, network interface 617, or an interface to a camera) a plurality of images of a video (e.g., frames 102), the plurality of images including a face. The received images may include images in which the face is partially or fully occluded, at different angles, etc.

At step 702, the system generates, by a convolutional neural network (CNN), a plurality of feature maps (e.g., feature maps 104, 106, and 108) at a plurality of semantic levels based on the plurality of images, the plurality of semantic levels including a lowest semantic level and a highest semantic level.

At step 703, the system generates, by a first classifier (e.g., global classifier 148) based on a first feature map (e.g., feature map 108) of the plurality of feature maps associated with the highest semantic level, a first emotion prediction (e.g., $P_G^2$)

associated with the face over a first set of emotions of a first affective level. For example, the first set of emotions may be the predefined emotions associated with affective level 2. In some embodiments, the first set of emotions includes happiness, sadness, neutral, anger, surprise, disgust, and fear.

In some embodiments, the system generates, via a plurality of transformer encoders (e.g., transformer encoders 124, 126, and 128) based on an input based on a respective feature map of the plurality of feature maps, a plurality of vector representations, wherein the generating the first emotion prediction is based on a first vector representation (e.g., $V_2$) of the plurality of vector representations based on the first feature map In some embodiments, the input based on the respective feature map includes a respective feature vector (e.g., feature vector 118) based on a 1×1 convolution and a flattening operation performed on the respective feature map of the plurality of feature maps.

At step 704, the system generates, by a second classifier (e.g., local classifier 144) based on the plurality of feature maps, a second emotion prediction (e.g., $P_L^2$)

associated with the face over the first set of emotions. In some embodiments, the generating the second emotion prediction is based on a combination of the plurality of vector representations. The combination of the plurality of vector representations may be generated via a plurality of S2ACs (e.g., S2AC 134 and 136).

Specifically, in some embodiments, the system may generate, via a plurality of S2ACs, a plurality of modified vector representations (e.g., $F_1$ and $F_2$) based on the plurality of vector representations. Each S2AC of the plurality of S2ACs may generate a respective modified vector representation of the plurality of modified vector representations based on a first input and a second input. The first input may include a first respective vector representation of the plurality of vector representations (e.g., $V_0$ or $V_1$). The second input may include at least one of a second respective vector representation of the plurality of vector representations different from the first respective vector representation (e.g., $V_2$), or a modified vector representation from a different S2AC (e.g., $F_1$). The combination of the plurality of vector representations on which the second emotion prediction is based may be a first modified vector representation of the plurality of modified vector representations (e.g., $F_2$).

At step 705, the system generates a fine-grain emotion prediction (e.g., $P_O^2$)

based on the first emotion prediction and the second emotion prediction. For example, the emotion prediction may be in the form of a probability associated with each emotion in the first set of emotions. The fine-train emotion prediction may be used to display a predicted emotion (e.g., the emotion with the highest probability) via a user interface. For example, a user interface device may display the video and the predicted emotion related to the video. In some embodiments, the fine-grain emotion prediction may be used to determine the emotion of a speaker that is interacting with a virtual avatar system such as device 800 or 815. The determined emotion of the speaker may be used by the system to adjust a response based on the emotion. For example, the same statement may be interpreted differently or require a different response when the related emotion is happiness compared to if the related emotion is disgust.

In some embodiments, the system may also generate a coarse-grain emotion prediction. For example, the system may generate, by a third classifier (e.g., local classifier 146) based on a second modified vector representation of the plurality of modified vector representations (e.g. $F_1$), a third emotion prediction (e.g., $P_L^1$)

associated with the face over a second set of emotions different from the first set of emotions. For example, the second set of emotions may be emotions at affective level 1. In some embodiments, the emotions at affective level 1 include positive, negative, and neutral. The system may compute, via an averaging operation based on the first emotion prediction, a fourth emotion prediction (e.g., $P_G^1$)

associated with the face over the second set of emotions. The system may then generate the coarse-grain emotion prediction (e.g., $P_O^1$)

based on the third emotion prediction and the fourth emotion prediction.

In some embodiments, aspects of the system may include parameters (e.g., weights and biases, convolution kernels, embedding lookup tables, etc.) that may be updated via a training process via backpropagation based on one or more loss functions. In some embodiments, the system may update parameters of at least one of the CNN, the first classifier, the second classifier, the third classifier, the plurality of transformer encoders, or the plurality of S2ACs based on a first loss function based on the fine-grain emotion prediction and the coarse-grain emotion prediction. For example, the first loss function may be the multi-class loss described in equation (2).

The first loss function may be further based on a comparison of the fine-grain emotion prediction to a ground truth singular emotion label associated with the plurality of images (e.g., Y).

In some embodiments, the system may generate, via a pretrained prediction model (e.g., pretrained model 152), a fifth emotion prediction (e.g., emotion prediction 156, $S_2$) over the first set of emotions based on individual images of the plurality of images. Note that at least in some embodiments predictions by local classifiers 144 and 146 and global classifier 148 are based on multiple images from a video, while emotion prediction 156 is a prediction associated with a single image.

In some embodiments, training may be performed further based on one or more additional loss functions, which may be used in weighted combination. For example, a second loss function may be based on a comparison of the plurality of vector representations to a modified fifth emotion prediction. In some embodiments, the second loss function may be a temporal affectivity extraction loss as described in equation (4). For example, the fifth emotion prediction may be $S_2$ (the emotion prediction 156 of pretrained model 152), and the modified fifth emotion prediction may be $S_2$ as modified in equation (4), specifically, $$I_i^T S_2 Y^{H_a}$$

as described above. A third loss function may be based on a comparison of the second emotion prediction and the third emotion prediction to the fifth emotion prediction. For example, the third loss function may be a global affectivity extraction loss as described in equation (5).

Figure 8A:
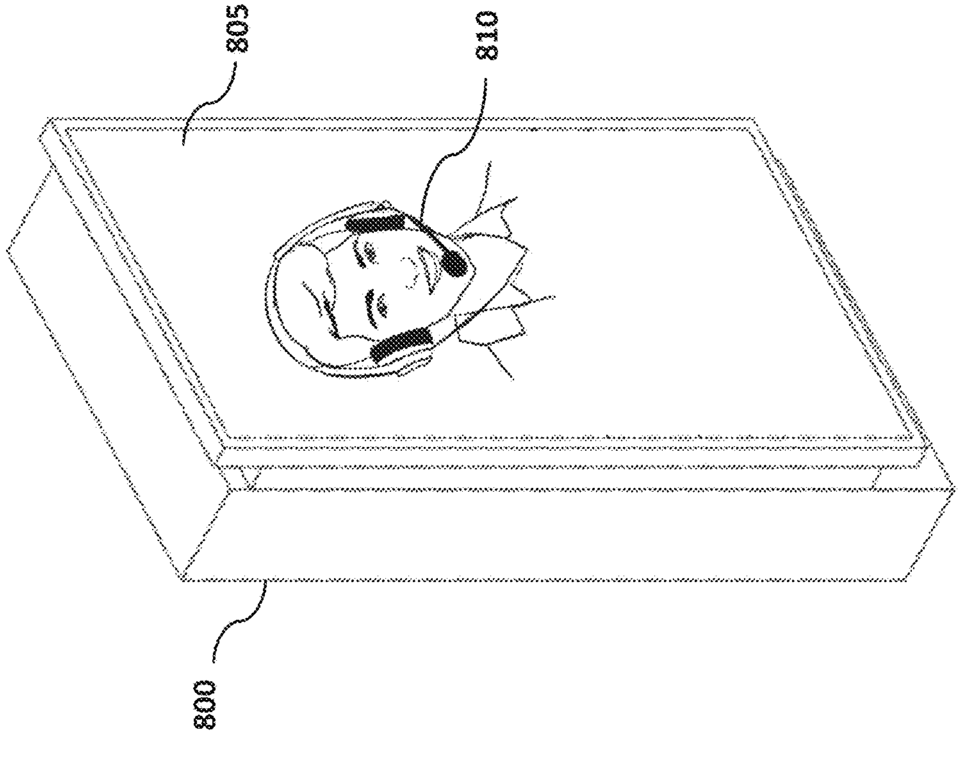
FIGS. 8A-8B are exemplary devices with digital avatar interfaces, according to some embodiments.

FIG. 8A is an exemplary device 800 with a digital avatar interface, according to some embodiments. Device 800 may be, for example, a kiosk that is available for use at a store, a library, a transit station, etc. Device 800 may display a digital avatar 810 on display 805. In some embodiments, a user may interact with the digital avatar 810 as they would a person, using voice and non-verbal gestures. Digital avatar 810 may interact with a user via digitally synthesized gestures, digitally synthesized voice, etc. The synthesized gestures and voice may be modified based on the predicted emotion of the user. For example, if the user is speaking while presenting an angry emotion on their face, digital avatar 810 may be configured to respond in a more calming tone and with more subtle gestures.

Device 800 may include one or more microphones, and one or more image-capture devices (not shown) for user interaction. Device 800 may be connected to a network (e.g., network 660). Digital Avatar 810 may be controlled via local software and/or through software that is at a central server accessed via a network. For example, an AI model may be used to control the behavior of digital avatar 810, and that AI model may be run remotely. In some embodiments, device 800 may be configured to perform functions described herein (e.g., via digital avatar 810). For example, device 800 may perform one or more of the functions as described with reference to computing device 400 or user device 610. For example, it may make emotion predictions based on facial expressions.

Figure 8B:
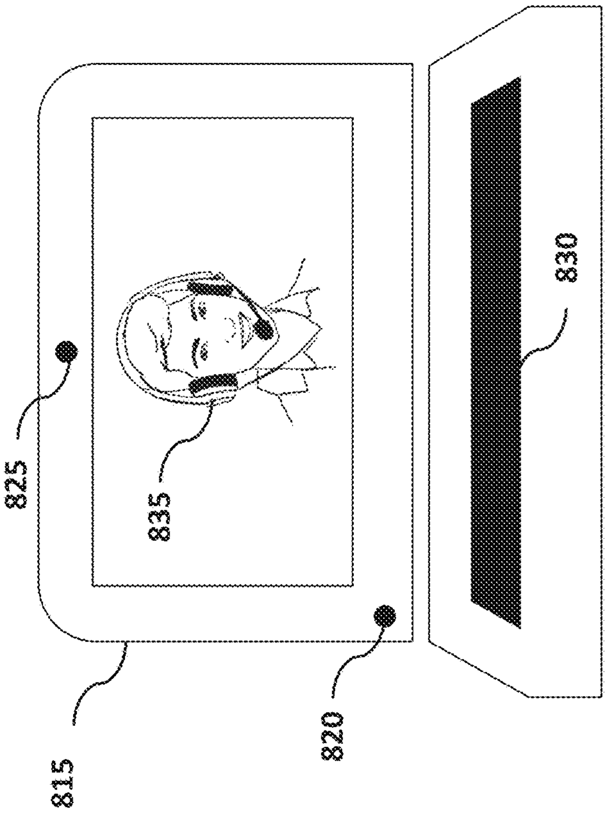

FIG. 8B is an exemplary device 815 with a digital avatar interface, according to some embodiments. Device 815 may be, for example, a personal laptop computer or other computing device. Device 815 may have an application that displays a digital avatar 835 with functionality similar to device 800. For example, device 815 may include a microphone 820 and image capturing device 825, which may be used to interact with digital avatar 835. Image capturing device 825 may be used to capture images/video of the user so that the device may predict the emotion of the user and change behavior of the avatar accordingly. In addition, device 815 may have other input devices such as a keyboard 830 for entering text.

Digital avatar 835 may interact with a user via digitally synthesized gestures, digitally synthesized voice, etc. In some embodiments, device 815 may be configured to perform functions described herein (e.g., via digital avatar 835). For example, device 815 may perform one or more of the functions as described with reference to computing device 400 or user device 610. For example, it may make emotion predictions as described herein, and may based avatar 835 behavior based on the predictions.

FIGS. 9A-14 provide charts illustrating exemplary performance of different embodiments described herein. Multiple datasets were used for training and evaluation. One dataset used in experiments is DFEW as described in Jiang et al., Dfew: A large-scale database for recognizing dynamic facial expressions in the wild, Proceedings of the 28$^{th}$ ACM International Conference on Multimedia, pp. 2881-2889, 2020. The DFEW dataset consists of over 16,000 video clips from more than 1500 movies, such as tragedies, comedies and romantic, etc. These video clips contain natural facial expressions and then is a significantly challenging dataset because of the unconstrained conditions, illumination, and occlusions. All samples on DFEW were split into five same-size parts without overlap. A second dataset utilized is AFEW as described in Dhall et al., Emotion recognition in the wild challenge 2013, Proceedings of the 15$^{th}$ ACM on International Conference on Multimodal Interaction, pp. 509-516, 2013. The AFEW contains about 1800 video clips collected from TV programs and movies, so AFEW is very close to real-world data. Samples on AFEW were split into three subsets: training, validation, and testing set. AEN was trained on the training set and results evaluated on the validation set. A third dataset used is FERV39K as described in Wang et al., Ferv39k: A large-scale multi-scene dataset for facial expression recognition in videos, Proceedings of the IEEE/CVF Conference on Computer Vision and Pattern Recognition, pp. 20922-20931, 2022. The FERV39K dataset is the current largest benchmark for dynamic FER in the wild. The FERV39K dataset contains over 38000 video clips collected from several scenarios, which can be partitioned into various scenes (i.e., daily life, business, and school). Samples on FERV39K were split into two subsets: training, and testing sets without overlapping.

As shown in FIGS. 10-13, various baseline methods were used for comparison, including Former-DFER as described in Zhao et al., Former-dfer: Dynamic facial expression recognition transformer, Proceedings of the 29$^{th}$ ACM International Conference on Multimedia, pp. 1553-1561, 2021.

Metrics used in the charts include an unweighted average recall (UAR) and the weighted average recall (WAR). UAR is an unweighted average recall and denotes the accuracy per class divided by the number of classes without consideration of instances per class. WAR is weighted average recall and means general accuracy. accuracy was evaluated for a 3-emotion and 7-emotion category to validate the model on both fine-grain emotion classification and coarse-grain emotion classification. The accuracy for a 7-emotion category is calculated by considering it as the correct answer when selecting the emotion class of the same group as the label in the 7 specific classes. High accuracy for 3 emotions denotes that the model reduces the hierarchy violation. Embodiments of the methods described herein are indicated in the charts as "AEN".

Figure 9B:
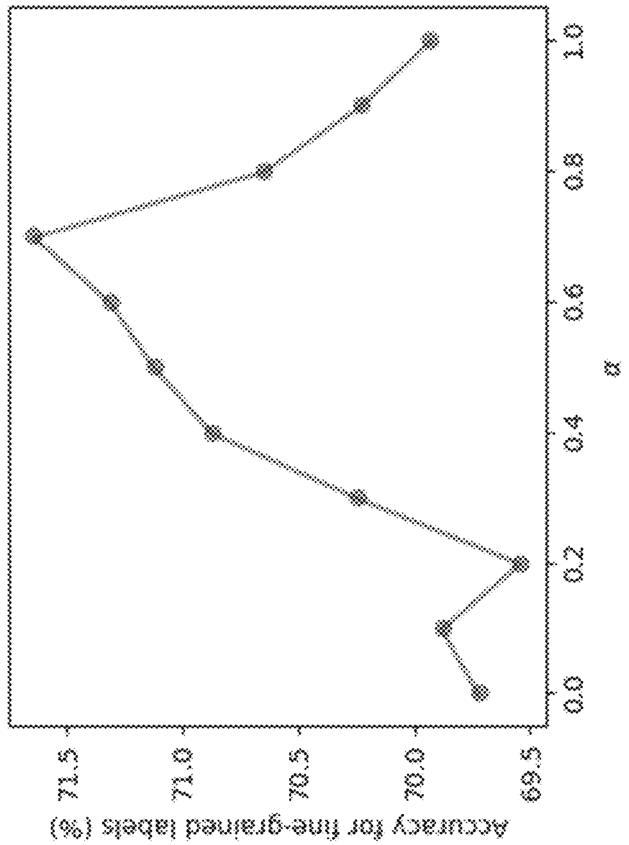
Figure 9A:
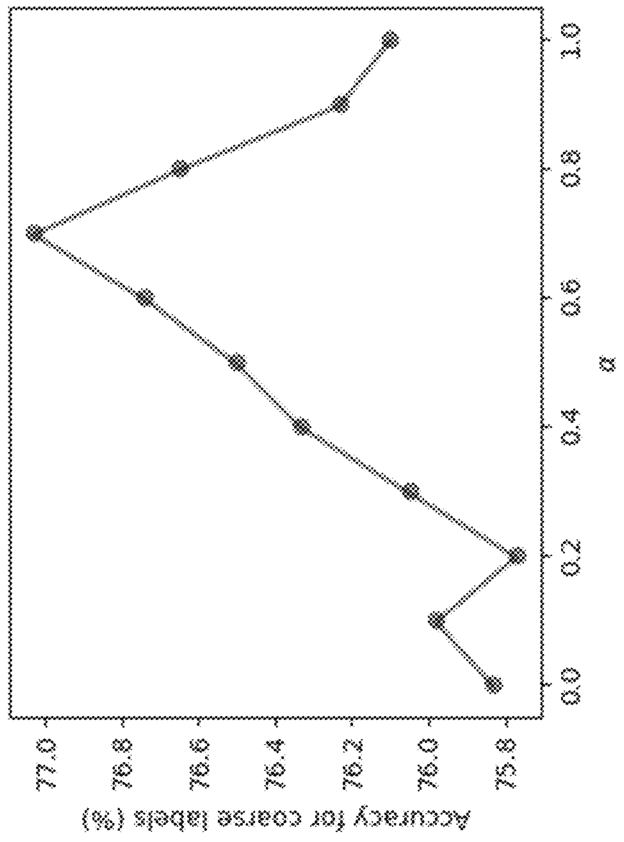

FIGS. 9A-9B illustrates the weighted average recall (WAR) variation at coarse and fine-grained labels (3 and 7 emotion class) based on different fusing parameter $\alpha$ values (from 0.0 to 1.0). FIG. 9A illustrates the course-grained labels results, and FIG. 9B illustrates the fine-grained labels results. As a increases from 0 to 0.7, there is a trend of improved performance. The best performances for 3 and 7 emotions is at $\alpha$=0.7 and then the accuracy decreases rapidly for both 3 and 7 emotion labels. This result proves the effect of local classifiers at different affective levels and implies that the balance between global and local classifiers should be adjusted appropriately.

FIG. 10 illustrates the contribution of different loss functions to the performance of the model. As illustrated, the loss functions are effective for dynamic FER. $L_{cr}$ denotes the general cross-entropy loss function for seven emotion classes in the experiment. In the fourth row, solely optimizing multi-class loss function $L_{mc}$ for emotion group learning degrades the performance of AEN. In contrast, the emotion group learning strategy succeeded by solving problems of dynamic FER using $L_{t\alpha}$ and $L_{g\alpha}$ in the 7th and 8th rows. The results imply that utilizing frame-level emotion-guided loss produces more discriminative features by reducing the loss of emotional information. Then, this maximizes the effect of emotion group learning.

FIG. 11 illustrates weighted average recall (WAR) with different categorical emotion groups. Tested groups included (1) completely mixed group (first row), (2) sentiment grouping (second row), and (3) emotion grouping (third row) as shown in FIG. 11. AEN with a group (1) leads to significant performance drop and instability during training. The difference between group (2) and group (3) is a small difference in whether the surprise class is included in neutral or positive in the parent category, but using group (3) outperforms AEN trained with a group (2) for emotion group learning strategy. Therefore, group (3) is used in the other experiments. This result indicates that the proper emotion group learning strategy encourages AEN to learn highly discriminative feature representation. In addition, it is illustrated that that surprise has many characteristics more similar to happy than neutral in dynamic facial expression.

FIG. 12 illustrates a comparison of methods on three datasets. The comparison methods can be divided into 3D and 2D CNN-based methods. The best performance is marked in bold. The baseline Former-DFER shows lower performance than the other methods as shown in FIG. 12. In contrast, AEN (representing an embodiment of methods described herein) produces the best results for unweighted average recall (UAR) and weighted average recall (WAR) in 3 and 7 emotion classes. Specifically, GCA-IAL is the state-of-the-art method with the UAR 55.71% and theWAR of 69.24% for 7 emotions, and DPCNet has the highest accuracy among the previous methods with the UAR 71.58% and the WAR 71.95% for 3 emotions. AEN outperforms GCA-IAL by 0.95% and 0.13% in terms of the UAR and the WAR for 7 emotions, respectively. Moreover, AEN obtains better results with respect to the UAR and the WAR of 3 emotions compared with DPCNet by 3.02% and 3.01%, respectively.

Figure 13B:
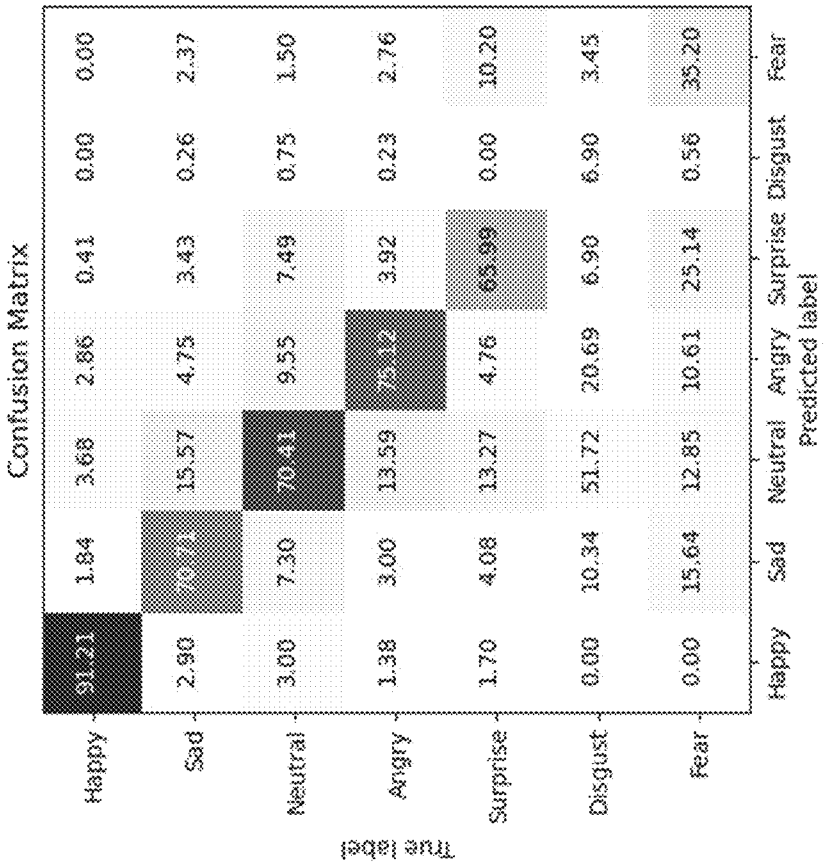
Figure 13A:
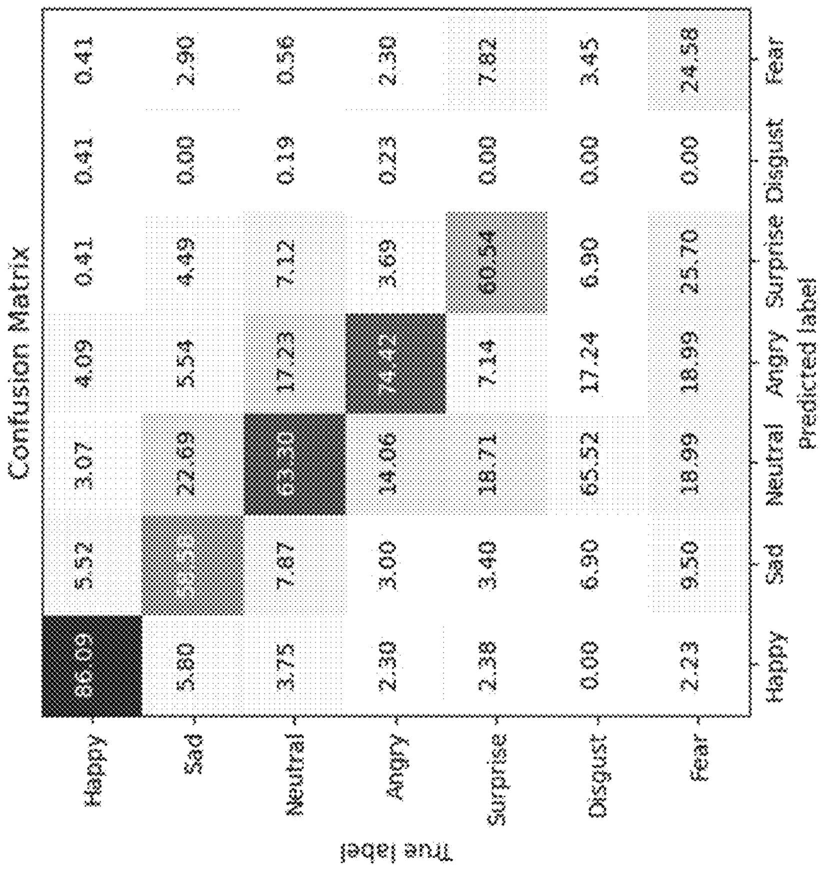

FIGS. 13A-13B illustrate confusion matrices for fine-grained labels. FIG. 13A illustrates the confusion matrix for Former-DFER, and FIG. 13B illustrates the confusion matrix for AEN. In DFER-Former on the DFEW dataset, a phenomenon occurs where the prediction is concentrated in the neutral class. AEN seems to ameliorate this problem. Experiments on coarse-grained labels (not shown) showed similar improvements, especially showing fewer hierarchy violation cases compared with Former-DFER.

FIG. 14 illustrates an evaluation of AEN on the AFEW dataset. As illustrated, AEN achieves the best results both in UAR and WAR for the 3 and 7 emotions class. AEN outperforms STT by 1.77% and 0.41% with respect to the UAR and WAR for 7 emotions, respectively. AEN also produces better results in terms of the UAR and the WAR of 3 emotions compared with STT by 1.4% and 0.35%, respectively.

Figure 15:
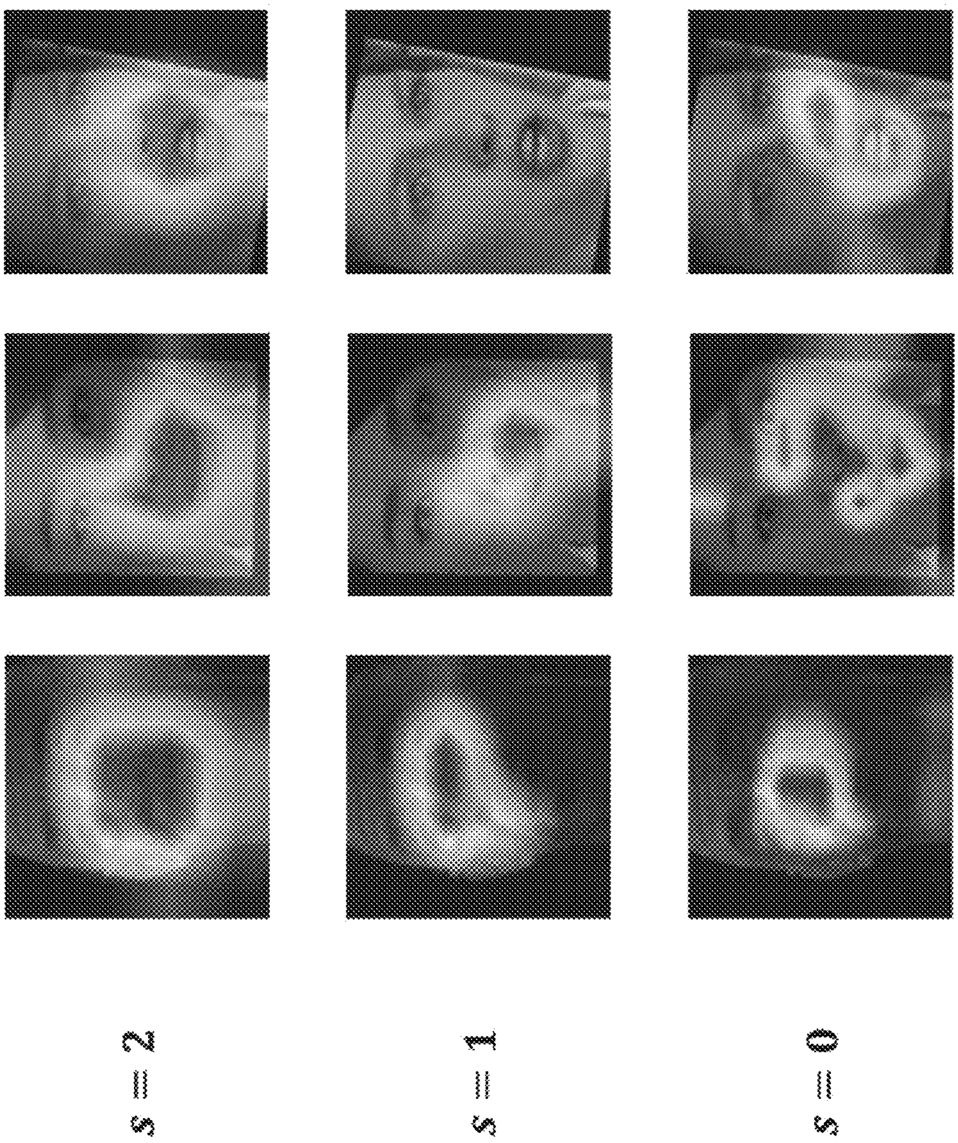
FIG. 15 illustrates an exemplary visualization of internal feature maps, according to some embodiments.

FIG. 15 illustrates an exemplary visualization of internal feature maps, according to some embodiments. As shown in FIG. 15, a generated activation map for AEN is visualized by Grad-CAM as described in Selvaraju et al., Grad-cam: Visual explanations from deep networks via gradient-based localization, Proceedings of the IEEE international conference on computer vision, pp. 618-626, 2017. Activation maps were extracted from the $I_0$, $I_1$, $I_2$ vectors for the temporal transformer at each semantic level and the left of the figure indicates the semantic level s. Since the input of global classifier $V_2$ should be trained as a discriminative feature for both coarse and fine-grained labels, the activation map at s=2 pays attention general The devices described above may be implemented by one or more hardware components, software components, and/or a combination of the hardware components and the software components. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method comprising:

receiving a plurality of images of a video, the plurality of images including a face;

generating, by a convolutional neural network (CNN), a plurality of feature maps at a plurality of semantic levels based on the plurality of images, the plurality of semantic levels including a lowest semantic level and a highest semantic level;

generating, via one or more transformer encoders based on an input based on a respective feature map of the plurality of feature maps, a plurality of vector representations;

generating, via a plurality of semantic to affective converters (S2ACs), a plurality of modified vector representations based on the plurality of vector representations, wherein each S2AC of the plurality of S2ACs generates a respective modified vector representation of the plurality of modified vector representations based on a first input including a first respective vector representation of the plurality of vector representations, and a second input including at least one of a second respective vector representation of the plurality of vector representations different from the first respective vector representation, or a modified vector representation from a different S2AC;

generating, by a first classifier based on a first feature map of the plurality of feature maps associated with the highest semantic level, a first emotion prediction associated with the face over a first set of emotions of a first affective level, wherein the generating the first emotion prediction is based on a first vector representation of the plurality of vector representations based on the first feature map;

generating, by a second classifier based on the plurality of feature maps, a second emotion prediction associated with the face over the first set of emotions, wherein the generating the second emotion prediction is based on a combination of the plurality of vector representations, and wherein the combination of the plurality of vector representations is a first modified vector representation of the plurality of modified vector representations; and generating a fine-grain emotion prediction based on the first emotion prediction and the second emotion prediction.

2. The method of claim 1, wherein the input based on the respective feature map includes a respective feature vector based on a 1×1 convolution and a flattening operation performed on the respective feature map of the plurality of feature maps.

3. The method of claim 1, further comprising:

generating, by a third classifier based on a second modified vector representation of the plurality of modified vector representations, a third emotion prediction associated with the face over a second set of emotions different from the first set of emotions;

computing, via an averaging operation based on the first emotion prediction, a fourth emotion prediction associated with the face over the second set of emotions; and generating a coarse-grain emotion prediction based on the third emotion prediction and the fourth emotion prediction.

4. The method of claim 3, further comprising:

updating parameters of at least one of the CNN, the first classifier, the second classifier, the third classifier, the one or more transformer encoders, or the plurality of S2ACs based on a first loss function based on the fine-grain emotion prediction and the coarse-grain emotion prediction.

5. The method of claim 4, wherein the first loss function is further based on a comparison of the fine-grain emotion prediction to a ground truth singular emotion label associated with the plurality of images.

6. The method of claim 4, further comprising:

generating, via a pretrained prediction model, a fifth emotion prediction over the first set of emotions based on individual images of the plurality of images, wherein the updating the parameters is further based on a second loss function based on a comparison of the plurality of vector representations to a modified fifth emotion prediction.

7. The method of claim 6, wherein the updating the parameters is further based on a second loss function based on a comparison of the second emotion prediction and the third emotion prediction to the fifth emotion prediction.

8. A computing device comprising:

one or more memories storing instructions; and one or more processors coupled to the one or more memories and configured, individually or in any combination, to execute the instructions to cause the computing device to:

receive a plurality of images of a video, the plurality of images including a face;

generate, by a convolutional neural network (CNN), a plurality of feature maps at a plurality of semantic levels based on the plurality of images, the plurality of semantic levels including a lowest semantic level and a highest semantic level;

generate, via one or more transformer encoders based on an input based on a respective feature map of the plurality of feature maps, a plurality of vector representations;

generate, via a plurality of semantic to affective converters (S2ACs), a plurality of modified vector representations based on the plurality of vector representations, wherein each S2AC of the plurality of S2ACs generates a respective modified vector representation of the plurality of modified vector representations based on a first input including a first respective vector representation of the plurality of vector representations, and a second input including at least one of a second respective vector representation of the plurality of vector representations different from the first respective vector representation, or a modified vector representation from a different S2AC;

generate, by a first classifier based on a first feature map of the plurality of feature maps associated with the highest semantic level, a first emotion prediction associated with the face over a first set of emotions of a first affective level, wherein the generating the first emotion prediction is based on a first vector representation of the plurality of vector representations based on the first feature map;

generate, by a second classifier based on the plurality of feature maps, a second emotion prediction associated with the face over the first set of emotions, wherein the generating the second emotion prediction is based on a combination of the plurality of vector representations, and wherein the combination of the plurality of vector representations is a first modified vector representation of the plurality of modified vector representations; and generate a fine-grain emotion prediction based on the first emotion prediction and the second emotion prediction.

9. The computing device of claim 8, wherein the input based on the respective feature map includes a respective feature vector based on a 1×1 convolution and a flattening operation performed on the respective feature map of the plurality of feature maps.

10. The computing device of claim 8, wherein the one or more processors are further configured to cause the computing device to:

generate, by a third classifier based on a second modified vector representation of the plurality of modified vector representations, a third emotion prediction associated with the face over a second set of emotions different from the first set of emotions;

compute, via an averaging operation based on the first emotion prediction, a fourth emotion prediction associated with the face over the second set of emotions; and generate a coarse-grain emotion prediction based on the third emotion prediction and the fourth emotion prediction.

11. The computing device of claim 10, wherein the one or more processors are further configured to cause the computing device to:

update parameters of at least one of the CNN, the first classifier, the second classifier, the third classifier, the one or more transformer encoders, or the plurality of S2ACs based on a first loss function based on the fine-grain emotion prediction and the coarse-grain emotion prediction.

12. The computing device of claim 11, wherein the first loss function is further based on a comparison of the fine-grain emotion prediction to a ground truth singular emotion label associated with the plurality of images.

13. The computing device of claim 11, wherein the one or more processors are further configured to cause the computing device to:

generate, via a pretrained prediction model, a fifth emotion prediction over the first set of emotions based on individual images of the plurality of images, wherein the updating the parameters is further based on a second loss function based on a comparison of the plurality of vector representations to a modified fifth emotion prediction; and a third loss function based on a comparison of the second emotion prediction and the third emotion prediction to the fifth emotion prediction.

14. A computing device comprising:

one or more memories storing a neural network based model; and one or more processors coupled to the one or more memories and configured, individually or in any combination, to train the neural network based model according to a loss function, wherein the neural network based model includes:

a convolutional neural network (CNN) configured to receive a plurality of images of a video including a face;

a plurality of transformer encoders configured to receive respective feature vectors based on respective feature maps of the CNN and generate respective vector representations of a plurality of vector representations;

a plurality of semantic to affective converters (S2ACs) configured to generate a plurality of modified vector representations based on the plurality of vector representations, wherein each S2AC of the plurality of S2ACs is configured to generate a respective modified vector representation of the plurality of modified vector representations based on a first input including a first respective vector representation of the plurality of vector representations, and a second input including at least one of a second respective vector representation of the plurality of vector representations different from the first respective vector representation, or a modified vector representation from a different S2AC;

a first classifier configured to generate a first emotion prediction based on a first vector representation of the plurality of vector representations over a first set of emotions;

a second classifier configured to generate a second emotion prediction based on a first modified vector representation of the plurality of modified vector representations over the first set of emotions;

a third classifier configured to generate a third emotion prediction based on a second modified vector representation of the plurality of modified vector representations over a second set of emotions different from the first set of emotions; and a computation block configured to:

generate, by an averaging operation based on the first emotion prediction, a fourth emotion prediction associated with the face over the second set of emotions, generate a fine-grain emotion prediction based on the first emotion prediction and the second emotion prediction, and generate a coarse-grain emotion prediction based on the third emotion prediction and the fourth emotion prediction, wherein the loss function is based on a comparison of the fine-grain emotion prediction and the coarse-grain emotion prediction to a ground truth singular emotion label associated with the plurality of images.

* * * * *